United States Patent Office 3,658,905
Patented Apr. 25, 1972

3,658,905
PROCESS FOR THE PURIFICATION OF
p-AMINOPHENOL
Henri Daunis, Vienne, Isere, and Marcel Gominet, Le
Peage-de-Roussillon, Isere, France, assignors to Rhone-
Poulenc S.A., Paris, France
No Drawing. Filed Mar. 12, 1969, Ser. No. 806,730
Claims priority, application France, Mar. 12, 1968,
143,564
Int. Cl. C07c 91/44
U.S. Cl. 260—575                                    9 Claims

ABSTRACT OF THE DISCLOSURE

Para-aminophenol, prepared by the catalytic hydrogenation of nitrobenzene in a strong acid medium, is purified by treatment with a liquid aliphatic, cycloaliphatic or aromatic ketone. The impure p-aminophenol may be washed with and/or recrystallised from ketones such as acetone, methylethylketone, methylisobutylketone, cyclohexanone or acetophenone and the purified p-aminophenol is found to remain colourless over several months when stored with stabilising agents. Further purification is achieved by dissolving the purified crystals in boiling water and recrystallising the p-aminophenol from the aqueous phase.

The present invention relates to the purification of p-aminophenol prepared by catalytic hydrogenation of nitrobenzene in strong acid medium.

The p-aminophenol prepared by catalytic hydrogenation of nitrobenzene in strong acid medium is contaminated by many nitrogen-containing organic impurities, including aniline, o-aminophenol, N-cyclohexyl-p-aminophenol, N-phenyl-p-aminophenol and 4,4'-diaminodiphenylether. The last, which represents about 1 to 3% of the crude product, is the most troublesome impurity and the most difficult to remove. Even in the presence of anti-oxidising agents, these impurities produce an intense colour in the p-aminophenol, and thus make it unsuitable for any industrial use.

British patent specification No. 1,028,078 discloses a process wherein the p-aminophenol prepared by the catalytic hydrogenation of nitrobenzene in a strong acid medium is purified by washing with an aliphatic alcohol. Unfortunately, the 4,4'-diaminodiphenylether is not efficiently removed by this process.

The present invention provides a process for the purification of p-aminophenol prepared by catalytic hydrogenation of nitrobenzene in strong acid medium, by which it is possible to remove substantially all the organic impurities other than 4,4'-diaminodiphenylether and to greatly reduce the amount of 4,4'-diaminodiphenylether present. The p-aminophenol so obtained generally contains less than 0.05% of 4,4'-diaminodiphenylether and it does not become coloured when kept in the presence of stabilising agents, such as sodium bisulphite, for several months.

The process of the present invention comprises contacting p-aminophenol with a liquid aliphatic, cycloaliphatic or aromatic ketone.

The ketones, which may be used include acetone, methylethylketone, methylisobutylketone, cyclohexanone and acetophenone, but in general any saturated unsubstituted aliphatic ketone of 3 to 9 carbon atoms, unsubstituted cycloaliphatic ketone of 5 to 7 carbon atoms, or phenyl (lower alkyl) ketone can be used.

In one embodiment of the invention, the contacting may be carried out in a heterogeneous phase, i.e. by the simple washing of finely divided impure p-aminophenol preferably at any speed and preferably at a temperature of 0° to 30° C. The washing may be performed by known methods such as stirring a suspension of the p-aminophenol in the ketone or, washing the p-aminophenol on a filter, on a column or in a centrifuge.

Depending upon the impurity content of the p-aminophenol (which contains, among other impurities, 0.5% to 3% of a mixture of N-phenyl- and N-cyclohexyl-p-aminophenol, and 1% to 3% of 4,4'-diaminodiphenylether) and the degree of purity required, the washing conditions, i.e. the method employed, the nature and quantity of the ketone used, the operating temperature, and the period of contact, may be varied within fairly wide limits. Generally speaking, 0.5 to 10 preferably 1 to 6 parts by weight of ketone to 1 part of p-aminophenol are used.

During the washing of the p-aminophenol with a ketone, a quantity, varying in accordance with the operating conditions, of the corresponding imine, is usually formed and some of this imine remains in the purified product, the remainder being dissolved in the ketone. When the imine content of the p-aminophenol exceeds about 0.2%, it is preferable to remove the imine by hydrolysis. This may be achieved by merely suspending the washed p-aminophenol in water and then boiling the mixture to form a solution and hydrolyse the imine. The liberated ketone is removed by distillation and the p-aminophenol is recovered by recrystallisation at ambient temperature. Thus, this hydrolysis is accompanied by a recrystallisation from an aqueous medium, and this further increases the purity of the p-aminophenol obtained. The p-aminophenol may be treated in a known manner with carbon black at the same time as the hydrolysis is carried out. The carbon black is added to the boiling aqueous solution, preferably after complete elimination of the liberated ketone.

Since after the hydrolysis the remaining mother liquors still contain some p-aminophenol, it is advantageous to recycle some of them in a subsequent operation.

The p-aminophenol obtained after washing and optional hydrolysis and recrystallisation from an aqueous medium, is then dried in vacuo or in a current of inert gas.

The effluent ketonic solution has a high impurity content at the beginning of the washing but its impurity content decreases gradually until at the end of the operation it contains substantially only p-aminophenol and imine. Thus, some of the ketonic effluent may be collected, subjected to hydrolysis, the ketone removed from the aqueous solution by distillation, and impure p-aminophenol obtained by recrystallisation from the aqueous solution may then be reintroduced into the purification process. The time when the collection of this effluent is started is chosen such that the p-aminophenol obtained has an impurity content similar to that of the crude product.

In another embodiment the purification may be carried out a homogeneous phase, i.e. the p-aminophenol may be dissolved in the ketone and the solution maintained at an elevated temperature, preferably below 100° C., for up to several hours, and the p-aminophenol then crystallises on cooling to ambient temperature. Under such conditions, the formation of imine becomes appreciable and may even be complete. It is therefore essential in this case to hydrolyse the crystals obtained from the ketonic solution in the manner previously described. The amount of ketone used in this homogeneous purification process is not critical, but it is preferable to use 5 to 10 parts by weight of ketone to 1 part of the p-aminophenol to be purified. The medium for the hydrolysis of the imine, freed from the ketone, for example, by distillation or azeotropic distillation, after optionally heating with carbon black, is cooled to crystallise the p-aminophenol.

The p-aminophenol may also be purified by a combined method. It may first be washed in the heterogeneous phase and then treated in a second stage in the homogeneous phase. The main advantage of this procedure is that it reduces the losses of p-aminophenol and therefore increases the yield of the purification. Owing to the preliminary washing, the aqueous solution obtained after hydrolysis of the imine is substantially free from impurity and it is therefore possible to recycle it in a subsequent purifying operation. On the other hand, the ketonic solution collected in the second stage after crystallisation of the imine-containing p-aminophenol also contains few impurities, so that impure but recyclable p-aminophenol may be obtained from it by hydrolysis and crystallisation from aqueous medium.

The efficiency of the purification of p-aminophenol prepared by the hydrogenation of nitrobenzene in strong acid medium may also be improved by performing the following preliminary operations: removal of the catalyst by filtration, neutralisation of the filtrate, purification of the filtrate in the liquid heterogeneous phase, treatment with a water-immiscible aliphatic, cycloaliphatic or aromatic ketone, removal of that fraction of the aqueous layer which does not contain p-aminophenol crystals, stirring the remainder of the aqueous layer to return the p-aminophenol into suspension, and filtration of the resultant liquid to obtain the p-aminophenol crystals.

The addition of a water-immiscible ketone to the neutralised hydrogenation filtrate causes a displacement of the aniline, which is the main by-product, from the aqueous phase into the organic phase. The presence of aniline in the organic phase increases the solubility of the other impurities in the p-aminophenol in that phase, and thus increases the efficiency of the purification. In addition, the removal of the aniline is facilitated because the mother liquors which only contain a small proportion of aniline may be directly rejected without purifying treatment. The aniline may optionally be recovered from the organic phase.

The water-immiscible ketone used in the washing of the hydrogenation filtrate must be liquid and aliphatic, cycloaliphatic or aromatic. The ketones which may be used include methylisobutylketone, 2,5-dimethylcyclohexanone or acetophenone. The amount of ketone used in the washing may vary within fairly wide limits but generally 0.5 to 6 parts by weight of ketone, and preferably from 1 to 3, to one part of p-aminophenol are used.

The washing of the hydrogenation filtrate is carried out with stirring to ensure contact between the organic and aqueous phases. When the stirring is stopped, the mixture separates into two layers, the greater part of the aqueous layer is decanted off and the remaining solution is stirred to return the p-aminophenol into suspension. The suspension is then filtered to recover the impure p-aminophenol crystals, which are treated with an aliphatic, cycloaliphatic or aromatic ketone. The amount of ketone used to treat the crystalline p-aminophenol may vary within wide limits. The greater the amount of ketone used to wash the hydrogenation filtrate, the smaller the amount required to wash the crystalline p-aminophenol. In general, 0.5 to 5 parts by weight of ketone are used to treat the crude crystals.

In a preferred embodiment of the invention, the hydrogenation filtrate is washed with 1 to 3 parts of ketone and the crystalline p-aminophenol is treated with 1 to 3 parts of ketone to 1 part of p-aminophenol. The ketone used in the washing of the filtrate may be different from that used in the purification of the crystals. The purification of the crystals may be carried out in the homogeneous phase or in the heterogeneous phase with a ketone which is miscible or immiscible with water.

The washing of the hydrogenation filtrate or the treatment of the crude crystals with a ketone may result in the formation of some of the corresponding imine. Some of this imine is present in the purified product, while the remainder is dissolved in the ketone. When the imine content of the p-aminophenol is greater than 0.2%, the imine is destroyed by hydrolysis.

The following examples are given to illustrate the invention:

EXAMPLE 1

300 g. of impure p-aminophenol containing 1.04% of a mixture of N-cyclohexyl-p-aminophenol and N-phenyl-p-aminophenol; 1.26% of 4,4'-diaminodiphenylether; 8.8% of aniline; 2.3% of o-aminophenol; and 23.7% of water are introduced into a 90 mm. diameter Buchner funnel connected to a vacuum flask and pressed down into a layer 4–5 cm. thick. The pressure in the flask is reduced to 570 mm. Hg, and then during 20 minutes 400 g. of acetone are sprinkled over the funnel with the aid of nitrogen as carrier gas. The reduced pressure is maintained for a further 15 minutes and then the washed crystals are suspended in 2400 cc. of water and the acetone removed by distillation until the temperature of the vapours reaches 98° C. The distillation lasts 30 minutes and about 100 g. of distillate are collected.

8 g. of carbon black are then added to the aqueous solution and the mixture is refluxed for 30 minutes. After the mixture has been filtered at elevated temperature, the carbon black residue on the filter is washed with 100 cc. of hot water, and then the product is crystallised under a nitrogen atmosphere by cooling to 15° C. with moderate stirring. The temperature is maintained at 15° C. for 30 minutes and the crystals are then filtered, centrifuged, washed with 100 ml. of 1% aqueous solution of sodium bisulphite and dried at 80° C. under a pressure of 20 mm. Hg.

172.5 g. of p-aminophenol containing less than 0.05% of 4,4'-diaminodiphenylether (the smallest amount detectable by present methods of thin-layer chromatography) are thus obtained.

The purified p-aminophenol does not undergo any colour change when kept in a closed receptacle at 20° C. for 3 months.

EXAMPLE 2

The procedure of the preceding example is followed using 800 g. of methylisobutylketone. The washed crystals are added to 2600 g. of water, and the methylisobutylketone is then removed by distillation as its azeotrope with water. This distillation, during which the temperature of the vapour rises from 70° to 100° C., lasts 30 minutes and 120 cc. of distillate are collected. 8 g. of carbon black are added to the ketone-free aqueous solution and then, to isolate 173.5 g. of p-aminophenol containing less than 0.05% of 4,4'-diamino-diphenylether, the procedure of the preceding example is followed.

EXAMPLE 3

The procedure of Example 1 is followed using 400 g. of acetophenone and an operating temperature of 20–25° C. The washed crystals are added to 2500 g. of water and the mixture is then distilled until the acetophenone is removed from the mixture by distillation (this distillation lasts about 2 hours). 8 g. of carbon black are added to the acetophenone-free aqueous solution and the product is then treated as described in Example 1 to obtain 173 g. of p-aminophenol containing less than 0.05% of 4,4'-diaminodiphenylether.

EXAMPLE 4

300 g. of impure p-aminophenol of the same composition as that of Example 1, and 1000 g. of acetone are placed under a nitrogen atmosphere in a 2 litre round-bottomed flask and refluxed for 2 hours. The mixture is cooled to 20° C. and allowed to crystallise with stirring. The crystals are removed by filtration, centrifuged, washed on a filter with 200 g. of acetone and then suspended in 1860 g. of water under a nitrogen atmosphere in a 3-litre round-bottomed flask. The mixture is boiled for one hour during which time the acetone liberated by the hydrolysis is distilled off. 10 g. of carbon black and 6 cc. of a 30% sodium bisulphite solution are then added and the mixture is refluxed for one hour. The procedure of Example 1 is then followed, and 120 g. of p-aminophenol containing less than 0.05% of 4,4'- diaminodiphenylether are collected.

EXAMPLE 5

20 kg. of nitrobenzene are injected into an autoclave heated to 95° C. and at a rate of 7.5 kg./h. are hydrogenated under a pressure of 10 bars. The said autoclave contains water (94 kg.), 96% sulphuric acid (16.15 kg.), cetyltrimethylammonium bromide (76.8 g.), catalyst containing 2.5% of platinum (160 g.), and absorbent charcoal (315 g.). After cooling the reaction products, the catalyst is removed by filtration and washed with water. From the 132 kg. of hydrogenation filtrate so obtained, 1500 g. are extracted. This 1500 g., containing 138.5 g. of crude p-aminophenol, is neutralised at 70° C. with 189 ml. of 50% aqueous sodium hydroxide solution and cooled, and then 300 g. of methylisobutylketone are added and the heterogeneous mixture is stirred for 30 minutes. The aqueous layer is decanted and the organic layer recovered, the p-aminophenol crystals being maintained in suspension in the methylisobutylketone by stirring. The resulting liquid is filtered, the crystalline p-aminophenol is recovered, and the crystals are washed in a filter with 300 g. of methylisobutylketone. The p-amionphenol crystals are then dissolved with boiling in 1800 g. of mother liquors which have already been employed in the course of a preceding experiment. 6 g. of animal charcoal are added, boiling is continued for 30 minutes, the charcoal is removed by filtration, and the p-aminophenol is crystallised.

131 g. of white solid p-aminophenol containing no impurities except 4,4'-diaminodiphenylether in a content below 0.05% (smallest amount detectable by the present methods of thin-layer chromatography) are thus obtained.

We claim:
1. A process for the production of a purified p-aminophenol of the formula

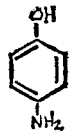

which comprises catalytically hydrogenating nitrobenzene in a strong acidic medium, filtering the hydrogenation product to remove catalyst and neutralizing the hydrogenation product and purifying the resulting impure p-aminophenol which contains impurities including 4,4'-diamino-diphenylether by a process which consists essentially of contacting the impure p-aminophenol with a liquid aliphatic, cycloaliphatic or aromatic ketone free from further functional groups and separating the purified p-aminophenol from the ketone solution containing the impurities.

2. Process according to claim 1, wherein the ketone is acetone, methylethylketone, methylisobutylketone, cyclohexanone or acetophenone.

3. Process according to claim 1, wherein the impure p-aminophenol is washed with the ketone.

4. Process according to claim 3, wherein 0.5 to 10 parts by weight of ketone to 1 part of p-aminophenol are used.

5. A process according to claim 1 wherein after contact with the ketone, the p-aminophenol is dissolved in boiling water to hydrolyze any imine produced during contact with the ketone and purified p-aminophenol is isolated from the aqueous phase by recrystallization.

6. Process according to claim 1, wherein the impure p-aminophenol is dissolved in the ketone by heating at a temperature below 100° C., p-aminophenol is crystallized from the cooled solution, the crystals so obtained are dissolved in boiling water to hydrolyse the imine present and purified p-aminophenol is isolated from the aqueous phase by recrystallization.

7. Process according to claim 6, wherein 5 to 10 parts by weight of ketone to 1 part of p-aminophenol are used.

8. Process according to claim 1, wherein the impure p-aminophenol is first washed with the ketone and then dissolved with heating in the ketone, crystallized from the cooled solution and the crystals are dissolved in boiling water to hydrolyse any imine present and purified p-aminophenol is isolated from the aqueous phase by crystallization.

9. Process according to claim 1, wherein 0.5 to 6 parts by weight of the liquid water-immiscible ketone to 1 part of p-aminophenol are used.

References Cited
UNITED STATES PATENTS

| 2,388,607 | 11/1945 | Emerson | 260—577 X |
| 3,428,672 | 2/1969 | Castellano et al. | 260—578 X |

FOREIGN PATENTS

| 1,028,078 | 5/1966 | Great Britain | 260—575 |

JOSEPH REBOLD, Primary Examiner

C. F. WARREN, Assistant Examiner

UNITED STATES PATENT OFFICE
CERTIFICATE OF CORRECTION

Patent No. 3,658,905          Dated December 6, 1972

Inventor(s) Henri Daunis, et al

It is certified that error appears in the above-identified patent and that said Letters Patent are hereby corrected as shown below:

Please correct the foreign application priority data to read

--France, Mar. 13, 1968, 143,564 and
France, Jan. 14, 1969, 6900452 -- .

Signed and sealed this 15th day of January 1974.

(SEAL)
Attest:

EDWARD M. FLETCHER, JR.
Attesting Officer

RENE D. TEGTMEYER
Acting Commissioner of Patents